United States Patent
Geller (10) Patent No.: US 9,956,948 B2
(45) Date of Patent: May 1, 2018

(54) SYSTEMS AND METHODS FOR IMPROVING GEAR SHIFTS

(71) Applicant: Toyota Motor Engineering & Manufacturing North America, Inc., Erlanger, KY (US)

(72) Inventor: Benjamin M. Geller, Hermosa Beach, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 305 days.

(21) Appl. No.: 15/005,739

(22) Filed: Jan. 25, 2016

(65) Prior Publication Data
US 2017/0210374 A1   Jul. 27, 2017

(51) Int. Cl.
| | |
|---|---|
| *B60W 10/11* | (2012.01) |
| *B60W 10/06* | (2006.01) |
| *B60W 10/08* | (2006.01) |
| *B60K 6/48* | (2007.10) |
| *B60W 20/00* | (2016.01) |
| *B60W 30/19* | (2012.01) |
| *F16H 63/50* | (2006.01) |
| *F16H 59/36* | (2006.01) |
| *F16H 61/04* | (2006.01) |

(52) U.S. Cl.
CPC .............. *B60W 10/11* (2013.01); *B60K 6/48* (2013.01); *B60W 10/06* (2013.01); *B60W 10/08* (2013.01); *B60W 20/00* (2013.01); *B60W 30/19* (2013.01); *F16H 63/502* (2013.01); *B60K 2006/4825* (2013.01); *B60Y 2200/92* (2013.01); *F16H 2059/366* (2013.01); *F16H 2061/0422* (2013.01); *Y10S 903/915* (2013.01)

(58) Field of Classification Search
CPC combination set(s) only.
See application file for complete search history.

(56) References Cited

U.S. PATENT DOCUMENTS

| | | | |
|---|---|---|---|
| 6,456,919 | B1 | 9/2002 | Korner et al. |
| 6,719,076 | B1 | 4/2004 | Tabata et al. |
| 7,400,964 | B2 | 7/2008 | Shiiba et al. |
| 7,789,798 | B2 | 9/2010 | Chen |
| 7,921,943 | B2 | 4/2011 | Ueoka et al. |
| 7,962,267 | B2 | 6/2011 | Honma et al. |
| 8,047,314 | B2 | 11/2011 | Oba et al. |
| 8,068,948 | B2 | 11/2011 | Sah et al. |
| 8,165,766 | B2 | 4/2012 | Muller et al. |

(Continued)

*Primary Examiner* — Derek D Knight
(74) *Attorney, Agent, or Firm* — Snell & Wilmer (57) ABSTRACT

A system includes an engine, a motor and a transmission coupled to the engine and the motor and that can be shifted from a first gear ratio to a second gear ratio. The system also includes an ECU that may receive or generate a shift command corresponding to an instruction for the transmission to shift from the first gear ratio to the second gear ratio and may determine a target engine speed corresponding to a desired speed of the engine when the transmission shifts from the first gear ratio to the second gear ratio. The ECU may control the motor to adjust the motor torque such that the motor torque causes the engine speed to become close or equal to the target engine speed and may cause the transmission to shift to the second gear ratio when the engine speed is within a threshold of the target engine speed.

20 Claims, 5 Drawing Sheets

(56) References Cited

U.S. PATENT DOCUMENTS

| | | |
|---|---|---|
| 8,306,707 B2 | 11/2012 | Zhang et al. |
| 8,388,494 B2 | 3/2013 | Schiele et al. |
| 8,532,891 B2 | 9/2013 | Swartling |
| 8,535,186 B2 | 9/2013 | Asaoka |
| 8,942,876 B2 | 1/2015 | Dai et al. |
| 9,014,899 B2 | 4/2015 | Lee et al. |
| 2011/0118920 A1* | 5/2011 | Kim ................... B60K 6/48 701/22 |
| 2014/0102187 A1* | 4/2014 | Andreae ............ G01M 15/102 73/114.71 |
| 2017/0174068 A1* | 6/2017 | Koch ................... B60K 6/52 |

* cited by examiner

SYSTEMS AND METHODS FOR IMPROVING GEAR SHIFTS

BACKGROUND

Field

The present disclosure relates to systems and methods for improving efficiency, performance and durability of vehicles during gearshifts and, more particularly, for controlling a rotational speed of an engine by a motor prior to a shift occurring.

Description of the Related Art

Processors are being designed to be smaller, faster, more efficient and less expensive than ever. Due to the increased capabilities and reduced costs, vehicle manufacturers have been including more processors and processor-based functions in vehicles. For example, electronic control units (ECUs) now control many vehicle functions such as engine timing and transmission shifts. Use of ECUs frequently increases efficiency. For example, the efficiency of vehicles using processor-controlled engine timing is greater than the efficiency of vehicles using timing belt controlled engine timing.

ECUs have not solved all vehicle inefficiencies. For example, gear shifting in a standard transmission vehicle is still relatively inefficient. During a shift, the transmission disconnects the engine from the axle. After this disconnection, the engine throttle is controlled to cause the speed to increase or decrease to match a target engine speed. In particular, the throttle is closed during an upshift and opened during a downshift. This throttling causes efficiency loss and reduced performance of the vehicle.

Furthermore, the throttle control may not be sufficient to cause the engine speed to reach the target engine speed. When the gearshift is complete, the transmission forces the engine speed to further increase or decrease to match the rotational speed output by the transmission. This forced change of engine speed can shorten the life of the engine and transmission. Furthermore, the forced change of engine speed is unpleasant to some drivers.

Thus, there is a need for systems and methods for increasing efficiency, performance, and durability of vehicles during gearshifts.

SUMMARY

What is described is a system for increasing efficiency of a vehicle. The system includes an engine for converting fuel to engine torque at an engine speed. The system also includes a motor for converting electrical energy into motor torque. The system also includes a transmission coupled to the engine and the motor. The transmission can be shifted from a first gear ratio to a second gear ratio. The system also includes an electronic control unit (ECU) coupled to the engine, the motor and the transmission. The ECU is designed to receive or generate a shift command corresponding to an instruction for the transmission to shift from the first gear ratio to the second gear ratio. The ECU may also determine a target engine speed that corresponds to a desired speed of the engine when the transmission shifts from the first gear ratio to the second gear ratio. The ECU may also control the motor to adjust the motor torque such that the motor torque causes the engine speed to become close or equal to the target engine speed. The ECU may also cause the transmission to shift to the second gear ratio when the engine speed is within a threshold of the target engine speed.

Also described is a hybrid vehicle for performing efficient shifts. The hybrid vehicle includes an engine that rotates at an engine speed. The hybrid vehicle also includes a motor-generator coupled to the engine for converting electrical energy into motor torque such that the engine speed can be controlled by adjusting the motor torque. The hybrid vehicle also includes a transmission coupled to at least one of the engine or the motor-generator, having a plurality of gears and designed to downshift and to upshift between the plurality of gears. The hybrid vehicle also includes an electronic control unit (ECU) coupled to the motor-generator and the transmission. The ECU may receive or generate a shift command corresponding to an instruction for the transmission to upshift or to downshift. The ECU may also determine a target engine speed corresponding to a desired speed of the engine when the upshift or downshift occurs. The ECU may also control the motor-generator to adjust the motor torque to cause the engine speed to become close or equal to the target engine speed.

Also described is a method for increasing efficiency of a vehicle. The method includes receiving or generating, by an electronic control unit (ECU), a shift command corresponding to an instruction for a geared component to shift from a first gear to a second gear. The method also includes determining, by the ECU, a target engine speed that corresponds to a desired speed of an engine when the geared component shifts from the first gear to the second gear. The method also includes controlling, by the ECU, a motor to adjust an amount of torque to cause a rotational speed of the engine to become close or equal to the target engine speed. The method also includes controlling, by the ECU, the geared component to shift to the second gear when the rotational speed of the engine is within a threshold of the target engine speed.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

The systems and methods described herein provide benefits and advantages over conventional gear-shifting systems. Some of these benefits and advantages correspond to increased vehicle efficiency. For example, use of the systems reduces power waste during shift events. Furthermore, the systems convert power that is typically wasted to electrical energy that can be used or stored by the vehicle. Additional benefits and advantages correspond to vehicle performance. For example, use of the systems results in faster gearshifts than use of conventional systems. Another benefit and advantage corresponding to vehicle performance is smoother gearshifts. When used in some manual transmission vehicles, the systems reduce or eliminate the need for a driver to engage a clutch. Additional benefits and advantages of the systems correspond to vehicle durability. For example, the systems reduce the shock caused by speed mismatches on both sides of the transmission after a gearshift.

An exemplary system includes an engine and a motor-generator. The motor-generator is coupled to the engine and can be used to adjust the rotational speed of the engine. The system also includes a transmission. The transmission converts the torque from the engine and/or the motor-generator to a torque having a different amplitude and angular velocity. The system also includes an electronic control unit (ECU). The ECU can receive a shift command from a gear shifter of a manual transmission or an auto-manual transmission or can generate a shift command when it determines that the transmission should shift gears. The ECU can determine a target rotational speed of the engine based on the shift request and a current rotational speed of the engine. The ECU can then control the motor-generator to cause the engine speed to reach a speed within a threshold of the target engine speed prior to the transmission shifting gears.

Figure 1:
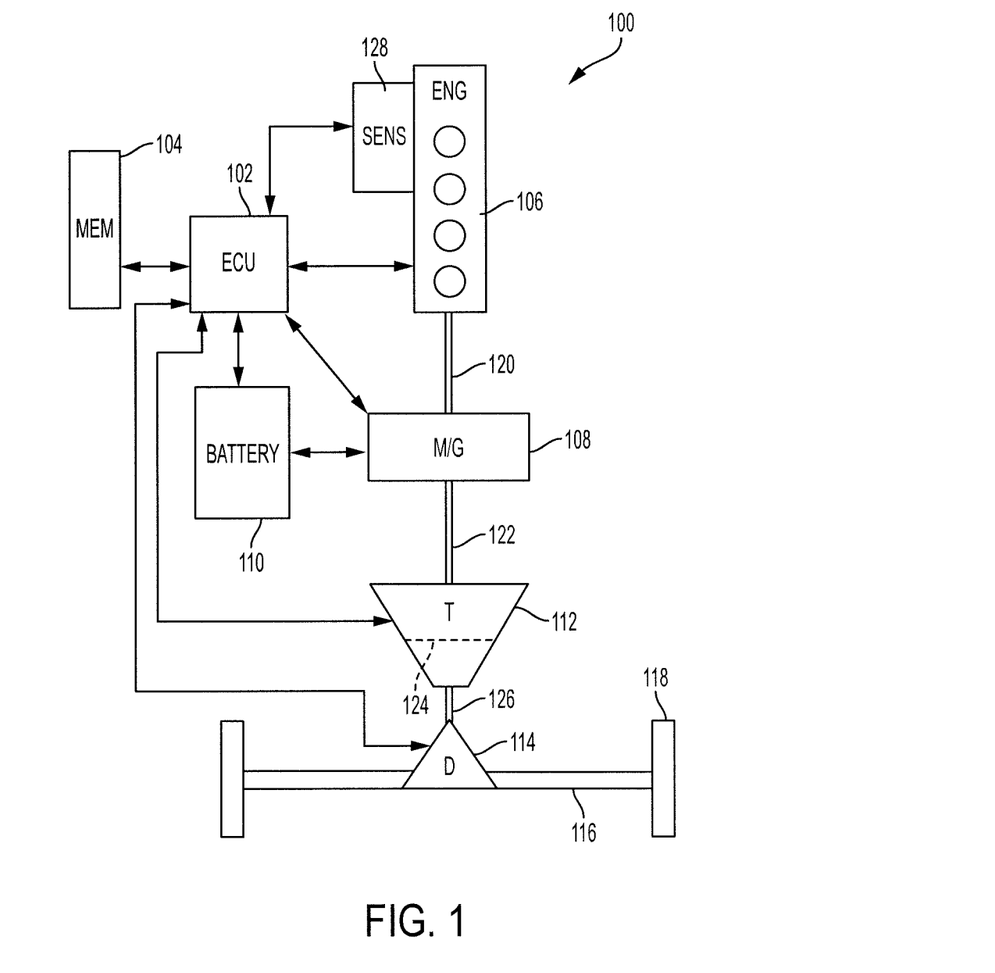
FIG. 1 is a block diagram of a hybrid vehicle having an engine and a motor-generator and that is designed for efficient gear shifts according to an embodiment of the present invention.

Turning to FIG. 1, a hybrid vehicle 100 includes an engine 106, a motor-generator 108, a battery 110, a transmission 112 and a differential 114. The vehicle 100 also includes an ECU 102 and a memory 104.

The engine 106 ignites fuel to generate torque at various rotational speeds (engine speeds). The engine 106 may be a gasoline engine. In some embodiments, the engine 106 may include any torque-creating device. The vehicle 100 can also include a sensor 128 for detecting the rotational speed of the engine 106. The sensor 128 may be a rotational speed sensor, an angular velocity sensor, or the like. The sensor 128 may be an integral component of the engine 106 or may be a separate component. The sensor 128 may be coupled to the engine 106 and/or to a shaft 120 that is coupled to the engine 106. When used herein, coupled can refer to a direct connection or an indirect connection. For example, if the sensor 128 is coupled to the shaft 120, it is also coupled to the engine 106.

The battery 110 is coupled to the motor-generator 108 and stores electrical energy. The motor-generator 108 converts electrical energy from the battery 110 into torque and converts torque into electrical energy to be stored by the battery. The motor-generator 108 is coupled to the engine 100 via the shaft 120 and to the transmission 112 via a shaft 122. The torque generated by the motor-generator 108 may be transferred to at least one of the engine 106 or the transmission 112. The motor-generator 108 may also convert torque from the engine 106 and/or the transmission 112 to electrical energy.

The transmission 112 can be shifted between a plurality of gears. The transmission 112 receives torque from at least one of the engine 106 or the motor-generator 108 and transfers the received torque to a differential 114 via a shaft 126. The transmission 112 may convert the torque received via the shaft 126 into a torque having a different amplitude and rotational speed prior to transferring it to the differential 114. The change in amplitude and rotational speed of the torque is determined by a gear ratio corresponding to the current gear of the transmission 112.

In some embodiments, the transmission 112 may be a continuously variable transmission (CVT) that can be set to any gear ratio within a range of gear ratios. The gear and/or gear ratio of the transmission 112 may be controlled by the ECU 102. In some embodiments, the transmission 112 can include both a geared transmission and a CVT.

The differential 114 transfers torque received from the transmission 112 to an axle 116 for driving wheels 118 of the vehicle 100. The differential 114 can include one or more set of gears. In that regard, the torque from the transmission 112 can be converted to a torque having a different amplitude and rotational speed by the differential 114. In some embodiments, the ECU 102 may control the current gear of the differential 114.

The ECU 102 may be electrically coupled to some or all of the components of the vehicle 100. The ECU 102 can include one or more processors or controllers specifically designed for automotive systems, and the functions of the ECU 102 can be implemented in a single ECU or in multiple ECUs. The ECU 102 may receive data from components of the vehicle 100, may determine data based on the received data and may control the operation of components based on the received or determined data.

The memory 104 may include one or any combination of the following: a RAM or other volatile or nonvolatile memory, a non-transitory memory or a data storage device, such as a hard disk drive, a solid state disk drive, a hybrid disk drive or other appropriate data storage. The memory 104 may store machine-readable instructions executable by the ECU 102 and may store any other data as instructed by the ECU 102.

Operation of the vehicle 100 will now be described. One skilled in the art will realize that the features and benefits described with reference to the vehicle 100 may be realized using a different vehicle configuration than shown in FIG. 1. In particular, the vehicle 100 is a pre-transmission parallel hybrid vehicle. However, the features and benefits described with reference to the vehicle 100 may be achieved by other vehicles having any other configuration. For example, the features and benefits may be realized using a post-transmission parallel hybrid vehicle, a series-hybrid vehicle, a through-the-road hybrid vehicle, a dual-motor vehicle, a power-split hybrid transmission vehicle or the like.

When the transmission 112 receives a request to shift gears, it disconnects the gears at a location 124. When disconnected, no torque is transferred between the differential 114 and the motor-generator 108.

The momentum of the vehicle 100 creates torque on the axle 116 via the wheels 118 as the vehicle 100 coasts. This torque can be transferred through the differential 114 and the transmission 112 to the motor-generator 108 and the engine 106. The motor-generator 108 may convert this received torque into electrical energy for storage in the battery 110.

Because the transmission 112 disconnects the motor-generator 108 and the differential 114 during a shift event, torque transfer therebetween is stopped. After reconnection of by the transmission 112, the torque transferred from the transmission 112 to the motor-generator has a different rotational speed because of the new gear ratio. In particular and in response to an upshift, the post-shift rotational speed that is output by the transmission 112 will be less than the pre-shift rotational speed. In response to a downshift, the post-shift rotational speed output by the transmission 112 will be greater than the pre-shift rotational speed.

It is desirable for the rotational speed of the engine 106 and the motor-generator 108 to be the same or substantially the same as the rotational speed of the torque output from the transmission 112 towards the engine 106. Otherwise, the torque from the transmission 112 will force the rotational speed of the engine 106 and the motor-generator 108 to rapidly increase or decrease to match the post-shift rotational speed of the transmission 112. This rapid change in rotational speeds can reduce the life of the engine 106 and the motor-generator 108. It may also be unpleasant to the driver and to any passengers.

ECUs of conventional vehicles control a position of an engine throttle during shifts. In particular, the throttle is opened or closed to increase or decrease the engine speed prior to completion of a shift. For example, the throttle is opened during a downshift to increase the rotational speed of the engine. This throttling is an inefficient use of resources.

Instead of controlling the throttle position of the engine 106, the ECU 102 controls the torque output of the motor-generator 108. The new torque output will change the rotational speed of the engine 106 because the engine 106 is coupled to the motor-generator 108.

During an upshift, the rotational speed input to the transmission 112 is decreased. Thus, the ECU 102 will control the motor-generator 108 to decrease the rotational speed of the engine 106. This can be achieved by generating torque in the reverse direction of the engine rotation. The engine speed may also be decreased by converting at least some of the torque from the transmission 112 into electrical power. The use of this converted energy during upshifts increases the efficiency of the vehicle 100.

Figure 2:
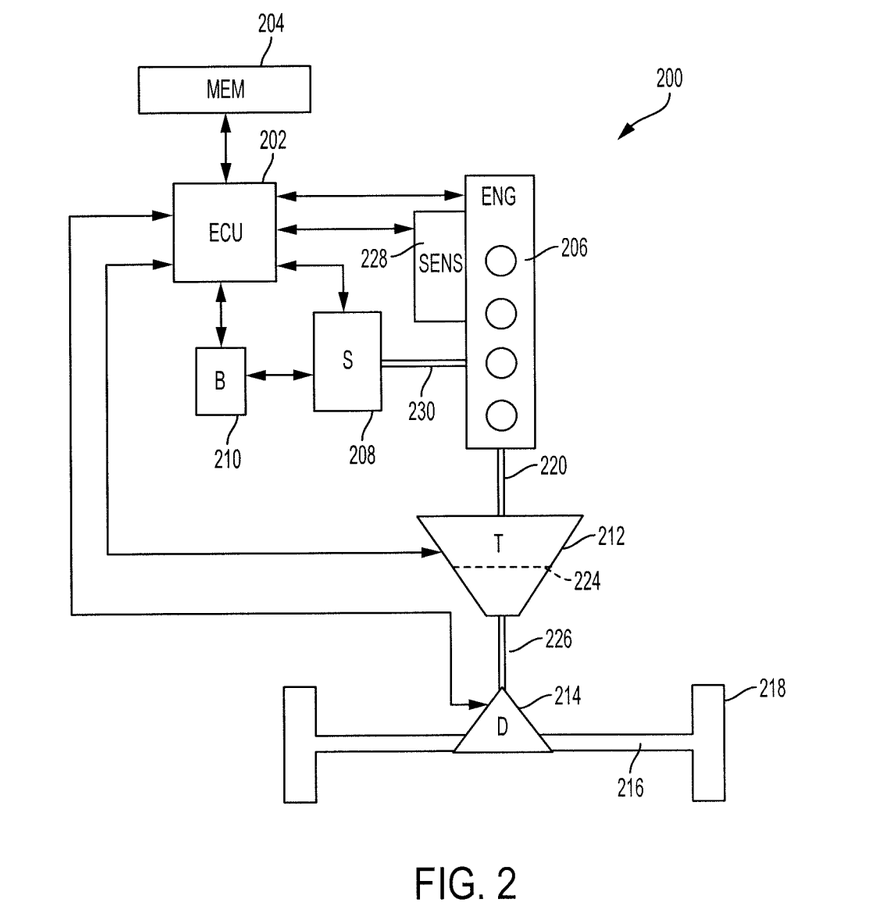
FIG. 2 is a block diagram of a vehicle having an engine and a starter and that is designed for efficient gear shifts according to an embodiment of the present invention.

Turning now to FIG. 2, a vehicle 200 is similar to the vehicle 100 of FIG. 1, except that the vehicle 200 is not a hybrid vehicle. In that regard, the ECU 202, the memory 204, the engine 206, the transmission 212, the differential 214, the sensor 228, the axle 216 and the wheels 218 operate in a similar manner as the corresponding components of the vehicle 100 of FIG. 1.

The vehicle 200 includes a battery 210 and a starter 208. The starter 208 is a motor that converts electrical energy from the battery 210 into torque. The torque is transferred to the engine 206 via a shaft 230. The torque generated by the starter 208 is used to rotate the engine 206 so that the engine 206 can start.

The ECU 202 can control operations of the starter 208. When the ECU 202 receives or generates a shift command, the ECU 202 may control the starter 208 to change the rotational speed of the engine 206 prior to the shift event occurring. In some embodiments, the starter 208 may not generate sufficient torque to change the rotational speed of the engine 206 to match the torque from the transmission after a shift. The throttle position of the engine 206 may be adjusted in addition to generating torque from the starter 208. This increases the likelihood of the engine speed reaching the target engine speed prior to the shift.

The vehicle 200 may also include an alternator (not shown). The alternator can convert torque into electrical energy. Thus, a vehicle having an alternator can decrease the engine speed by converting torque into electrical energy.

Figure 3:
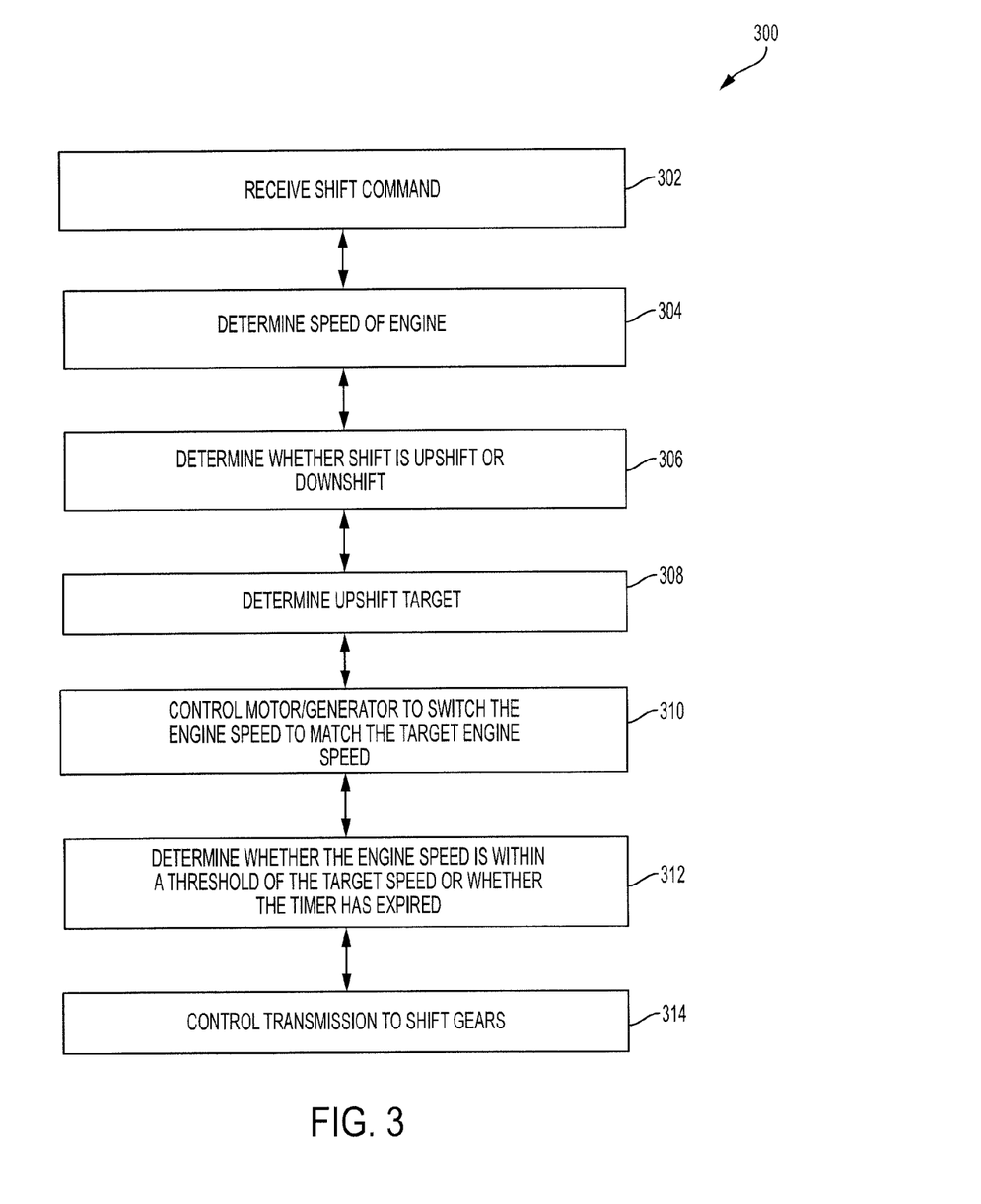
FIG. 3 is a flowchart illustrating a method for increasing efficiency, performance and durability of vehicles having an engine and a motor according to an embodiment of the present invention.

Turning now to FIG. 3, a method 300 for increasing vehicle efficiency, performance and durability during a gearshift is shown. The method 300 can be performed by an ECU of a vehicle, such as the ECU 102 of the vehicle 100 of FIG. 1 or the ECU 202 of the vehicle 200 of FIG. 2. One skilled in the art will realize that the method 300 is applicable to transmissions and to any other component having multiple gears. For example, the method 300 can be applied to a differential having multiple gears.

The method 300 begins with the ECU generating and/or receiving a shift command at block 302. In an automatic transmission vehicle or a semi-automatic transmission vehicle, the ECU may determine when a shift should occur based on the vehicle speed, the engine rotational speed or the like. In a manual transmission vehicle or an auto-manual transmission vehicle, the ECU may receive a shift command from a gear shifter.

The ECU may determine the speed of the engine in block 304 based on at least one of received data or detected data. A sensor of the vehicle may detect the rotational speed of the engine and the ECU may receive the detected speed from the sensor. In some embodiments, the ECU may determine or estimate the rotational speed of the engine using other data and/or algorithms. For example, the ECU may calculate the engine speed based on a vehicle speed and a current gear ratio of the transmission.

The ECU determines whether the shift command corresponds to a downshift or an upshift in block 306. This is determined based on at least one of the received shift command or the shift command generated by the ECU.

The ECU then determines a target engine speed in block 308. The ECU determines an upshift target engine speed if the shift command is an upshift and determines a downshift target engine speed if the shift command is a downshift. The target engine speed corresponds to a desired rotational speed of the engine that will be close to the rotational speed of the transmission immediately after a shift. Stated differently, the target engine speed corresponds to a required engine speed in the event of a gear change. For example, if an upshift command is generated in block 306, the ECU will determine at what speed the wheels will drive the engine shaft via the transmission after the upshift occurs. If the engine rotates at this speed at the time of the shift, the rotational speeds on both sides of the transmission will match. The target engine speed can be determined or should be known based on the following equation:

$$\text{target engine speed} = \text{propshaft speed} \times \text{target gear ratio}.$$

Some vehicles may allow shifts of multiple gears such as from first gear to third gear. ECUs of these vehicles may determine target engine speeds for any gear ratio into which the transmission can be shifted. For example, a vehicle may allow a downshift from third gear to either second gear or first gear, and may allow an upshift from third gear into either fourth gear or fifth gear. The ECU may determine the target engine speed for a downshift to second gear, a target engine speed for a downshift to first gear, a target engine speed for an upshift to fourth gear and a target engine speed for an upshift to fifth gear.

A shift command can be generated or received at any time during driving. The engine may determine the upshift and downshift target engine speeds continuously or periodically. When the target engine speeds are determined periodically, the frequency may be relatively high so that the target engine speeds at any given time are based on relatively current data. For example, the engine speed may be determined every second, every tenth of a second, every hundredth of a second, or the like.

After determining the target engine speed, the ECU controls the motor-generator to cause the engine speed to become close to or equal to the target engine speed in block 310. When the shift is an upshift, the ECU controls the motor-generator to reduce the speed of the engine. The motor-generator can reduce the speed of the engine in various ways. For example, the motor-generator may be controlled to apply torque in a direction other than the current direction of engine rotation. This torque in the reverse direction of the engine rotation will counteract the current torque of the engine shaft, reducing the engine speed.

A driver may become uncomfortable if the time from generation of the shift command to the actual shift of the transmission takes a long time. It is thus desirable for the motor-generator to cause the engine speed to reach the upshift target engine speed within a predetermined amount of time.

The ECU can also cause the engine speed to decrease by switching the motor-generator to a regeneration mode. The motor-generator does not typically output torque when in the regeneration mode. Rather, the motor-generator receives torque from the transmission and/or the engine and converts it to electrical energy. This reduces a total amount of torque and slows rotation of the engine. Conversion of torque by the motor-generator may be referred to as adjusting a torque output of the motor-generator.

The speed reduction caused by the regeneration mode may not be sufficient to reduce the engine speed within the predetermined time. In these situations, the ECU can control the motor-generator to both operate in the regeneration mode and to generate torque in the reverse direction of the engine rotation.

When the shift is a downshift, the ECU controls the motor-generator to increase torque generation. The increased torque generation increases the speed of the engine. The increased torque generation of the motor-generator should cause the engine speed to reach the target engine speed within the predetermined amount of time. Notably, the torque generation of the motor-generator should be sufficient to increase the engine speed without adjusting the engine throttle position or with minimal adjustments to the engine throttle position. Because motor-generators can provide more torque in a shorter amount of time than engines, they will cause the engine speed to match the target engine speed relatively quickly.

Many factors can affect engine speed such as a throttle position, whether the vehicle is accelerating or decelerating, or the like. Thus, it is difficult to cause the engine speed to exactly match the target engine speed. It is acceptable for the shift to occur when the current engine speed is within a threshold of the target engine speed. The threshold may be any desired range, such as within a predetermined percentage of the target engine speed or within a certain range of rotational speeds. For example, it may be sufficient for the current engine speed to be within 10% of the target engine speed or within 100 rpm of the target engine speed.

In block 312, the ECU determines whether the current engine speed is within the threshold of the target engine speed. The ECU may make this determination by comparing the detected engine speed with the target engine speed. When the current engine speed is within the threshold amount of the target engine speed, the ECU may control the transmission to shift gears. Otherwise, the ECU may wait for the motor-generator to further increase or decrease the engine speed before shifting the transmission.

Electronic components, such as sensors, can fail from time to time. It is desirable for the vehicle to be capable of shifting gears at most times such as when a sensor fails or a motor-generator is unable to sufficiently increase or decrease the engine speed to the target engine speed within the predetermined amount of time. The ECU may utilize a timer to increase the likelihood that the vehicle can still shift in response to such a condition.

The ECU may start the timer when the shift command is generated or received. The timer corresponds to a maximum amount of time that should pass between receipt or generation of a shift command and the shift occurring. If the timer expires before the current engine speed has reached the target engine speed, the ECU may control the transmission to shift gears.

The method 300 of FIG. 3 provides several benefits and advantages over conventional vehicles. For example, because motors can provide more torque in a shorter amount of time than engines, shifts are quicker. In ideal implementations of the method 300, operation of a clutch by a driver may not be necessary because the engine speed can be controlled to match the target engine speed for any gearshift.

Benefits and advantages related to durability are also achieved due to the quick engine speed changes. Engine and transmission components in conventional vehicles are subject to wear and tear from use. This wear and tear may increase during gearshifts due to speed mismatches between the two sides of the transmission. Use of the method 300 allows the speeds on both sides of the transmission to match prior to the gearshift, reducing the corresponding wear. The method 300 further reduces wear of the vehicle parts because no correction for driver error is required. Driver error may include over-revving the engine during a shift, bad shifting, or the like. Thus, because speed mismatches between vehicle components are reduced or eliminated, wear of the gears is also reduced.

Benefits and advantages corresponding to efficiency are also achieved using the method 300. For example, use of the method 300 reduces losses associated with gear changes by transferring power to the electrical system when the transmission is in a neutral position (such as during a gearshift). During a shift event (when the transmission is in neutral), any power generated by an engine of a conventional vehicle is wasted because it is not transferred to the wheels. However, the vehicle 300 transfers this engine power to electrical components, reducing or eliminating waste of engine power. Efficiency is further improved because the motor-generator captures energy associated with engine speed reduction.

Vehicles having any type of engine (or other torque-creating device) and any type of motor can perform the method 300. For example, when a vehicle has no motor-generator, such as the vehicle 200 of FIG. 2, the ECU can control the starter to adjust the engine speed in response to receiving or generating a shift command.

Vehicles that allow shifts of multiple gears at once can also use the method 300. For example, such a vehicle can determine an upshift target engine speed corresponding to an upshift of two gears. In response to a request to upshift two gears, the ECU can control the motor-generator to increase the engine speed to match the two-gear upshift target engine speed.

Some vehicles include continuously variable transmissions (CVTs) that allow for continuous changes in gear ratio. CVTs do not have the performance, durability and efficiency characteristics of conventional vehicles during shift events. Thus, benefits of the method 300 may be reduced in some vehicles using CVTs. However, some CVTs are controlled to shift between gear ratios that are similar to gear ratios of non-CVT transmissions. ECUs of these vehicles may cause current engine speeds to match upshift target engine speeds between such large shifts by using the method 300.

Some vehicles include a CVT and a set of gears between the CVT and the axle (such as a differential). These vehicles can use the method 300 to increase performance, durability and efficiency of the gear set between the CVT and the axle.

Figure 4:
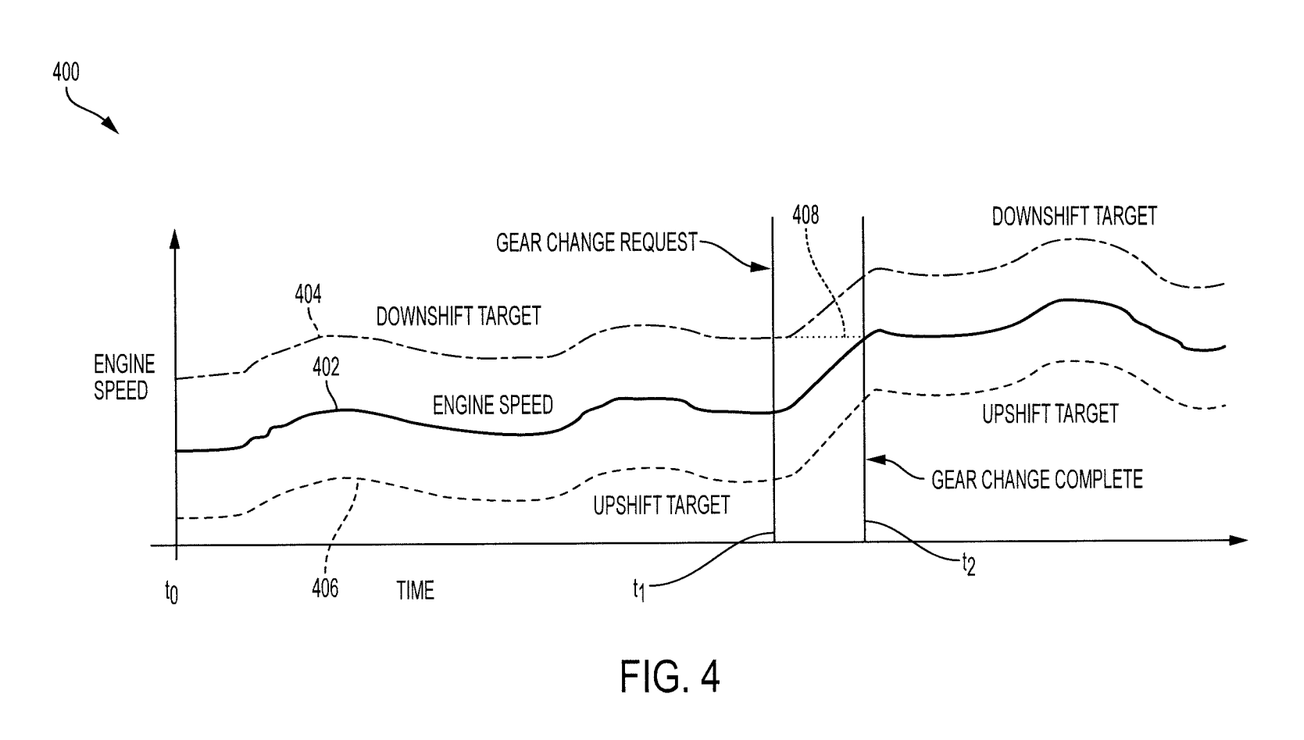
FIG. 4 is a chart illustrating results of a vehicle implementing the method of FIG. 3 according to an embodiment of the present invention.

Turning now to FIG. 4, a chart 400 illustrates results of a vehicle using the method 300 of FIG. 3. The chart 400 shows a current engine speed 402, a downshift target engine speed 404 and an upshift target engine speed 406 over a period of time. As shown, the ECU continuously determines the downshift target engine speed 404 and the upshift target engine speed 406. The current engine speed may be detected by a rotational speed sensor or an angular velocity sensor. The ECU may receive the current engine speed from the sensor.

The chart 400 begins at time $t_0$. Between times $t_0$ and $t_1$, the engine speed 402 remains relatively unchanged. At time $t_1$, the ECU of the vehicle generates a downshift command.

The ECU then controls the motor-generator of the vehicle (or a starter/alternator of a non-hybrid vehicle) to adjust the engine speed to reach the downshift target engine speed. Because the shift is a downshift, the ECU will control the motor-generator to increase the speed of the engine. The ECU also starts a timer at or shortly after time $t_1$.

The ECU controls the motor-generator to increase torque output between times $t_1$ and $t_2$. The increased torque results in increased engine speed. The ECU compares the current engine speed to the downshift target engine speed continuously or periodically between times $t_1$ and $t_2$. The ECU also monitors the timer to determine if/when it expires.

The timer does not expire between times $t_1$ and $t_2$ in the example shown in FIG. 4. However, the ECU determines that the current engine speed is within the threshold value of the downshift target engine speed at time $t_2$. The ECU controls the transmission to downshift in response to the detected engine speed being within the threshold of the downshift target engine speed. The ECU may also control the motor-generator to reduce torque output at time $t_2$.

Figure 5:
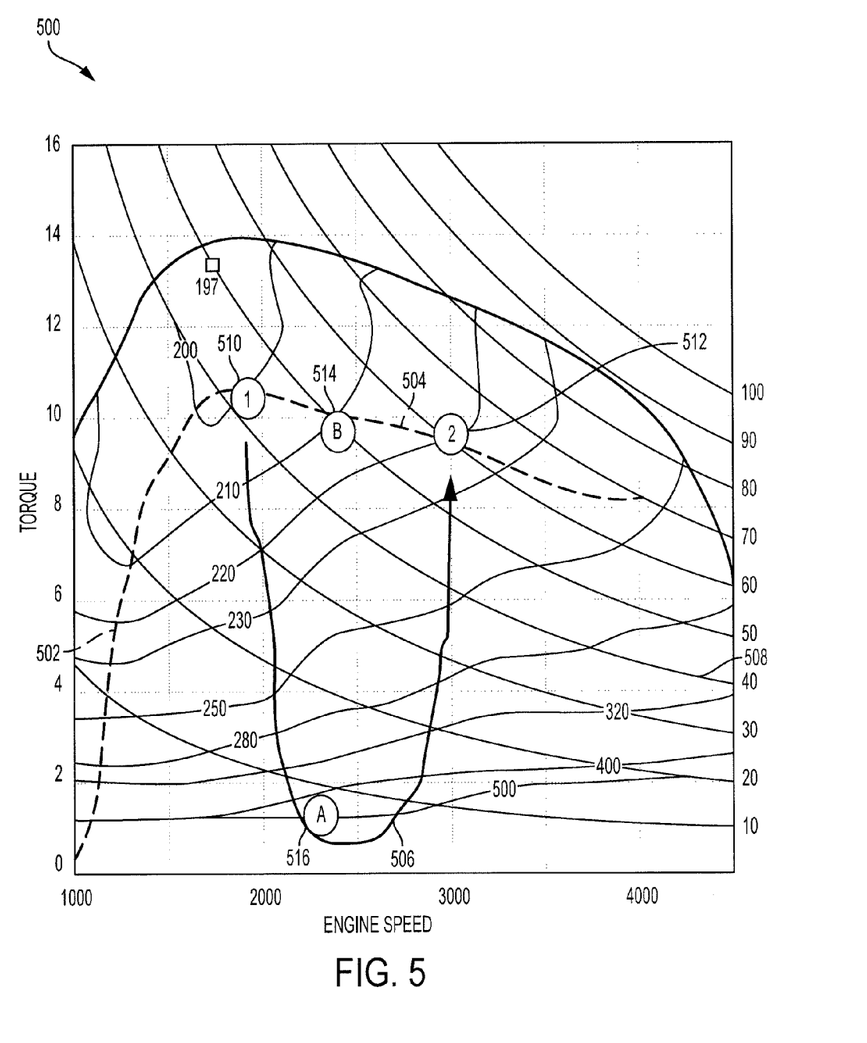
FIG. 5 is a power map showing efficiency benefits of a vehicle implementing the method of FIG. 3 according to an embodiment of the present invention.

Turning to FIG. 5, a power map 500 shows power characteristics of a vehicle similar to the vehicle 100 of FIG. 1 using the method 300 of FIG. 3 and a conventional vehicle not using the method 300. The X-axis of the power map 500 corresponds to engine speed and the Y-axis of the power map corresponds to torque applied by the engine and motor-generator. Lines 508 of the power map 500 correspond to various levels of power.

The power map 500 shows data corresponding to an upshift. The upshift command is received by the ECU at the point 510 and the upshift is completed at the point 512. A line 502 corresponds to ideal power generation of a vehicle during an upshift. A line 504 corresponds to power characteristics between points 510 and 512 of an engine of the vehicle using the method 300. A line 506 corresponds to power characteristics between points 510 and 512 of an engine of the conventional vehicle.

During the shift, the engine and the motor-generator of a conventional vehicle are disconnected from the vehicle axle. This drastically decreases the torque and the power applied to the axle as shown by the line 506. The vehicle power drops from the point 510 to a point 516. This corresponds to a power drop from a value of 40 to a value of 10 and torque decreases from a value of 10 to a value of 2. The throttle of the engine is concurrently controlled to be wide-open between points 510 and 512 to increase the engine speed. Any fuel burned during this time is wasted.

It is ideal for a vehicle to increase torque and power output during an upshift event as shown by the ideal line 502, not to decrease it as conventional vehicles do. The line 504 corresponding to the vehicle using the method 300 has similar characteristics as the ideal line 502.

In particular, the upshift request is received at the point 510. Shortly thereafter, the ECU controls a motor of the vehicle to increase torque. The increased torque increases the engine speed and further results in greater torque and power output. It is clear by comparing the line 506 to the line 504 that the power characteristics of the vehicle using the method 300 correspond to increased efficiency, durability and performance as compared to the power characteristics of a conventional vehicle.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for increasing efficiency of a vehicle comprising:
   an engine configured to convert fuel to engine torque at an engine speed;
   a motor configured to convert electrical energy into motor torque;
   a transmission coupled to the engine and the motor and configured to be shifted from a first gear ratio to a second gear ratio; and
   an electronic control unit (ECU) coupled to the engine, the motor and the transmission and configured to:
      receive or generate a shift command corresponding to an instruction for the transmission to shift from the first gear ratio to the second gear ratio,
      determine a target engine speed that corresponds to a desired speed of the engine when the transmission shifts from the first gear ratio to the second gear ratio,
      control the motor to adjust the motor torque such that the motor torque causes the engine speed to become close or equal to the target engine speed, and
      cause the transmission to shift to the second gear ratio when the engine speed is within a threshold of the target engine speed.

2. The system of claim 1 further comprising a sensor coupled to the engine and to the ECU and configured to detect the engine speed.

3. The system of claim 1 wherein the motor is a starter motor usable to start the engine.

4. The system of claim 1 wherein the motor is a motor-generator and is further configured to convert torque into electrical energy when in a regeneration mode.

5. The system of claim 4 wherein the shift from the first gear ratio to the second gear ratio is an upshift and wherein the ECU is configured to adjust the motor torque by controlling the motor-generator to at least one of operate in the regeneration mode or output torque in a reverse direction of engine rotation to cause the engine speed to decrease.

6. The system of claim 1 wherein the shift from the first gear ratio to the second gear ratio is a downshift and wherein the ECU is configured to control the motor to increase the motor torque to cause the engine speed to increase.

7. The system of claim 1 wherein the ECU is further configured to start a timer when the ECU receives or generates the shift command and to cause the transmission to shift to the second gear ratio when the timer expires if the engine speed does not reach a speed within the threshold of the target engine speed before the timer expires.

8. The system of claim 1 wherein the ECU causes the engine speed to become close or equal to the target engine speed without adjusting a throttle position of the engine.

9. A hybrid vehicle for performing efficient shifts comprising:
an engine configured to rotate at an engine speed;
a motor-generator coupled to the engine and configured to convert electrical energy into motor torque such that the engine speed can be controlled by adjusting the motor torque;
a transmission coupled to at least one of the engine or the motor-generator, having a plurality of gears and configured to downshift and to upshift between the plurality of gears; and
an electronic control unit (ECU) coupled to the motor-generator and the transmission and configured to:
receive or generate a shift command corresponding to an instruction for the transmission to upshift or to downshift,
determine a target engine speed corresponding to a desired speed of the engine when the upshift or the downshift occurs, and
control the motor-generator to adjust the motor torque to cause the engine speed to become close or equal to the target engine speed.

10. The hybrid vehicle of claim 9 further comprising a sensor coupled to the engine and to the ECU and configured to detect the engine speed.

11. The hybrid vehicle of claim 9 wherein the ECU is configured to control the motor-generator to at least one of operate in a regeneration mode in which torque is converted into electrical energy or to output torque in a reverse direction of engine rotation to cause the engine speed to decrease when the shift command corresponds to the upshift.

12. The hybrid vehicle of claim 9 wherein the ECU is configured to control the motor-generator to increase the motor torque to cause the engine speed to increase when the shift command corresponds to the downshift.

13. The hybrid vehicle of claim 9 wherein the ECU is further configured to start a timer when the ECU receives or generates the shift command and to cause the transmission to upshift or downshift when the timer expires if the engine speed does not reach a speed within a threshold of the target engine speed before the timer expires.

14. The hybrid vehicle of claim 9 wherein the ECU causes the engine speed to become close or equal to the target engine speed without adjusting a throttle position of the engine.

15. A method for increasing efficiency of a vehicle comprising:
receiving or generating, by an electronic control unit (ECU), a shift command corresponding to an instruction for a geared component to shift from a first gear to a second gear;
determining, by the ECU, a target engine speed that corresponds to a desired speed of an engine when the geared component shifts from the first gear to the second gear;
controlling, by the ECU, a motor to adjust an amount of torque to cause a rotational speed of the engine to become close or equal to the target engine speed; and
controlling, by the ECU, the geared component to shift to the second gear when the rotational speed of the engine is within a threshold of the target engine speed.

16. The method of claim 15 wherein the geared component is positioned between a transmission of the vehicle and an axle of the vehicle.

17. The method of claim 15 further comprising controlling, by the ECU, the motor to at least one of operate in a regeneration mode to convert torque into electrical energy or to output torque in a reverse direction of engine rotation to cause the rotational speed of the engine to decrease when the shift to the second gear is an upshift.

18. The method of claim 15 further comprising controlling the motor to increase the amount of torque to cause the rotational speed of the engine to increase when the shift to the second gear is a downshift.

19. The method of claim 15 further comprising:
starting, by the ECU, a timer in response to receiving or generating the shift command, and
controlling, by the ECU, the geared component to shift to the second gear when the timer expires if the rotational speed of the engine does not reach a speed within the threshold of the target engine speed before the timer expires.

20. The method of claim 15 further comprising controlling, by the ECU, a throttle of the engine to remain in a current position between receiving or generating the shift command and controlling the geared component to shift to the second gear.

* * * * *